United States Patent [19]

Niemuth

[11] 3,770,152

[45] Nov. 6, 1973

[54] DOLLY FOR TV SET OR STEREO OR THE LIKE

[76] Inventor: Lewis C. Niemuth, Rt. 1, Larsen, Wis. 54947

[22] Filed: Dec. 1, 1971

[21] Appl. No.: 203,781

[52] U.S. Cl............................. 214/374, 280/47.29
[51] Int. Cl.............................................. B62b 1/06
[58] Field of Search........................ 214/374, 390; 280/47.29

[56] References Cited
UNITED STATES PATENTS

| 1,465,945 | 8/1923 | Lea ..................................... 214/374 |
| 3,370,725 | 2/1968 | Jones .................................. 214/390 |
| 2,623,760 | 12/1952 | Fornelius ......................... 214/374 X |

Primary Examiner—Albert J. Makay
Attorney—S. L. Wheeler

[57] ABSTRACT

A dolly frame with four easily turning wheels carries two separate hoists, one of which is a windlass and the other a jack, the two hoists working in unison in lifting a workpiece and transporting it. An optionally useable addition involves a freely detachable and connectable belt unit for climbing stairs.

2 Claims, 6 Drawing Figures

PATENTED NOV 6 1973

PATENTED NOV 6 1973　　　　　　　　　　　　　　　　3,770,152
SHEET 2 OF 2
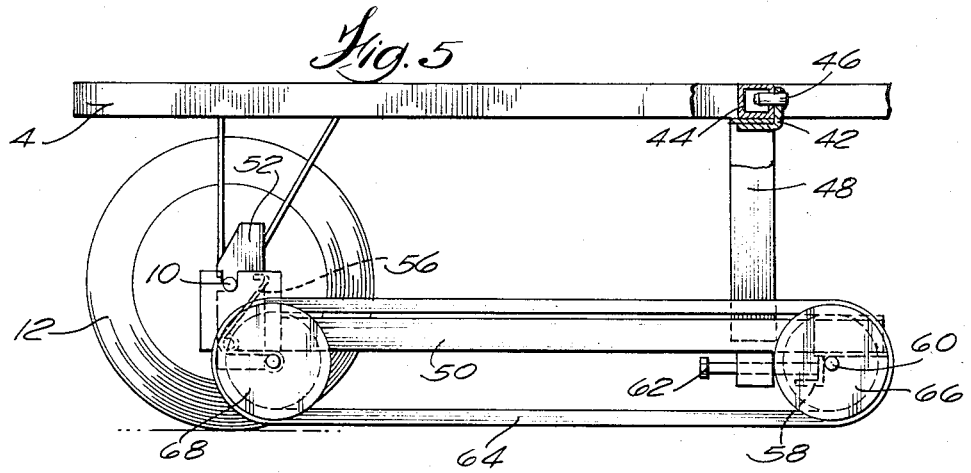
Fig. 5
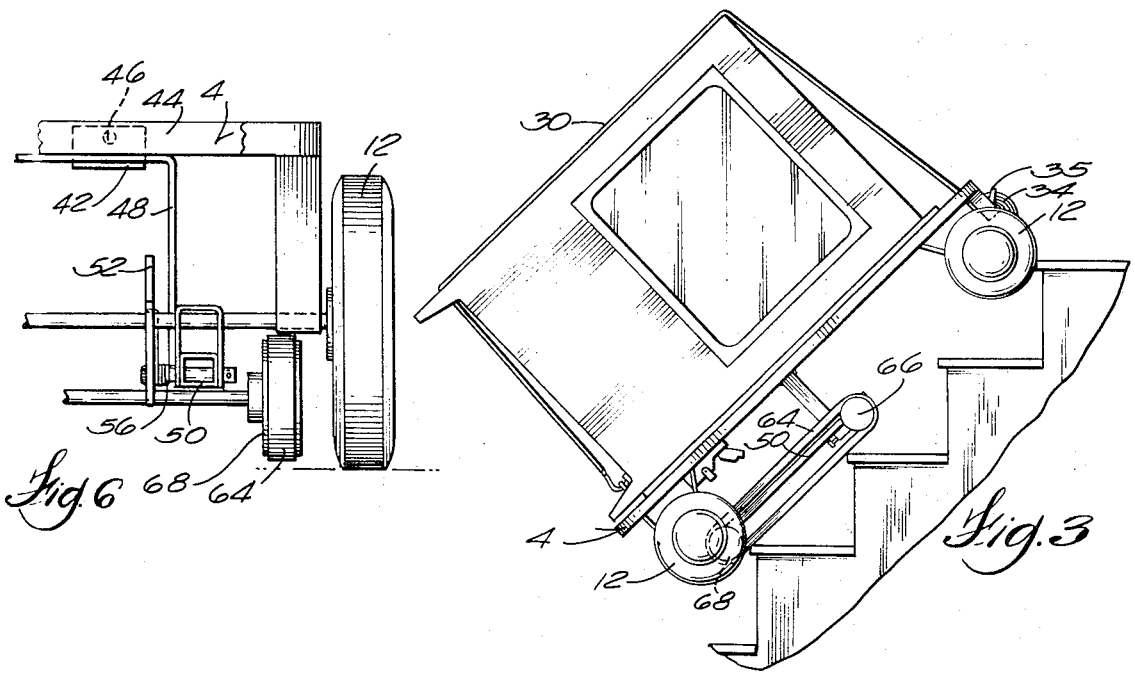
Fig. 6
Fig. 3
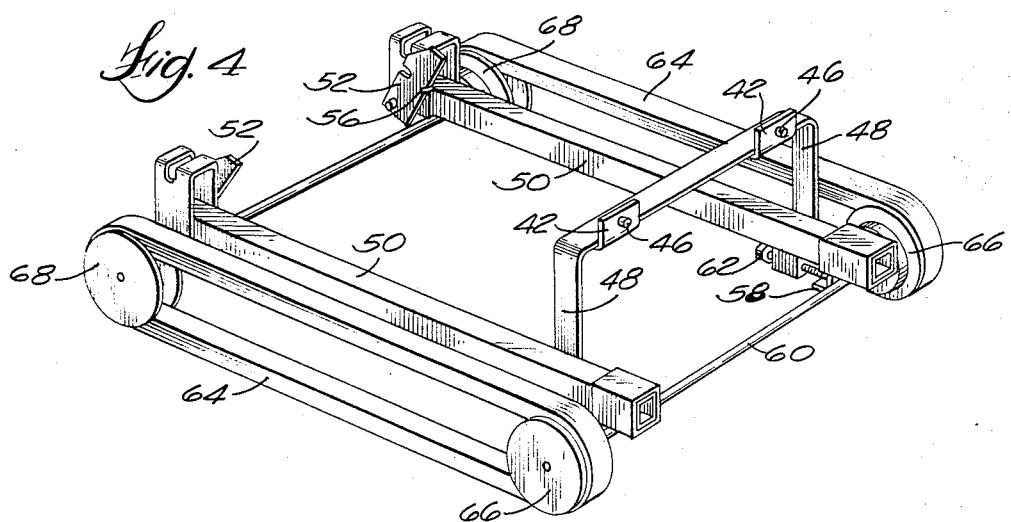
Fig. 4

DOLLY FOR TV SET OR STEREO OR THE LIKE

BACKGROUND OF THE INVENTION

TV sets and stereos and the like are difficult to handle, frequently requiring to be lifted by two or more people. When the work is strapped to the dolly as facilitated by this invention, it may be turned on end and lifted by the jack without stress or injury and may be moved with ease into a delivery vehicle, particularly one with a low floor.

SUMMARY OF INVENTION

A dolly for transporting an entertainment set such as television or stereo has a frame supported by four wheels and having a padded face. Near one end it has a windlass below that face. Built into the frame is a jack post with an actuating jack handle and a jack body which is reciprocable manually along the frame in a position in which the body projects above the padded face where it serves as a platform or bracket for supporting the set to be transported.

The set standing upright, the dolly is upended next to it with its padded face toward the set. The dolly is then rolled to engage its padded face with the set, and its jack body extending beneath the set and between its proximate legs. When the jack body is beneath the set, the handle on the under side of the dolly is reciprocated to actuate the pawls of the jack to lift the said legs just off the floor.

A strap trained on the windlass is now drawn about the set and a hook at its end is engaged in a hole in the platform which supports the set. The brake lever of the windlass is temporarily released to permit the strap to be passed about the set and drawn snug. The strap is now connected to the windlass at a level below the dolly face and then, after passing around the set, is connected to the dolly platform which projects above the dolly face. Reciprocation of the jack handle at one end and the windlass lever at the other places the strap under tension to connect the dolly and the set unitarily.

The legs of the set, if any, may be used as handles to manipulate the assembly. For example, see FIG. 2, wherein the legs 36 are depressed and the weight of the assembly is balanced over the wheels 12'. The wheels 12 are thereby tilted onto the truck deck 38. At no time does the operator have to lift more than half the weight of the article to manipulate it onto or from the vehicle. By the same token, the dolly can be used to assist the operator in manipulating the weight of the article up or down stairs or to other desired positions.

With the TV set or stereo thus strapped securely to the dolly by the strap, the jack hoist, and the windlass, the legs of the set can be used as handles for manipulating the dolly and set as a unit onto and from the vehicle. The dolly component readily pivots on its wheels for lifting the set to or from the deck of the transporting vehicle.

A completely separable attachment includes stair climbing belts which can be used or not as desired and which, when not needed, are readily removable completely to relieve the device of the extra weight.

BRIEF DESCRIPTION OF DRAWINGS

FIG. 3 is a view of the device in side elevation as it appears with the stair attachment.

FIG. 4 is a view in perspective showing the stair attachment as it appears when separate from the dolly.

FIG. 5 is a view of the stair attachment in side elevation separate from the dolly.

FIG. 6 is a fragmentary view of the stair attachment in rear elevation.

DETAILED DESCRIPTION

Figure 1:
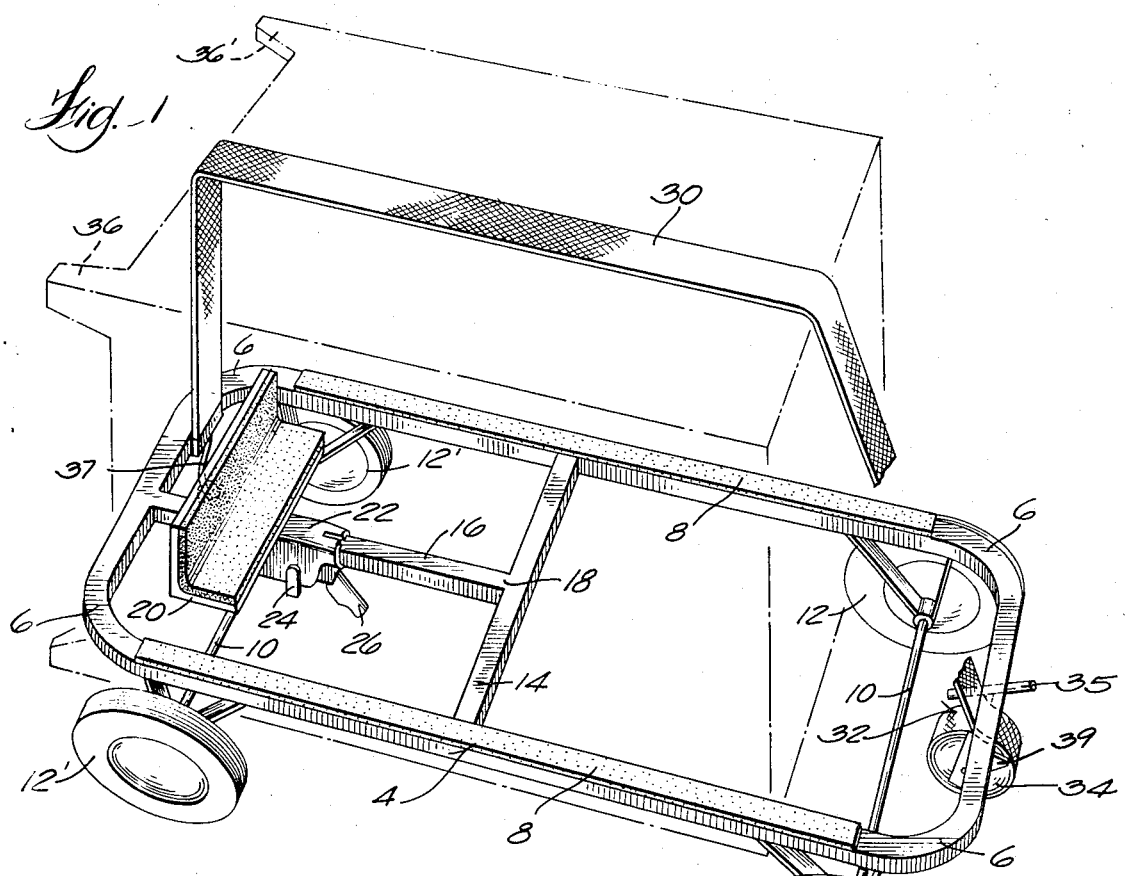
FIG. 1 is a view in front three-quarter perspective diagrammatically showing the dolly in use with the set on its side for unitarily transporting an entertainment set such as a TV or stereo.

The preferred form of the dolly comprises a generally rectangular frame 4 with rounded corners 6 and having its sides equipped with sponge tapes 8. The frame is supported by axles 10 carried on wheels 12 which preferably have ball bearings. Centrally with respect to the frame is disposed a cross bar 14, beneath which there is a built-in longitudinally disposed jack post 16 connected at 18 to the cross bar and having a foot or shelf 20 connected to its jack body 22. The jack base or shelf 20 is slideably suspended on the jack post beneath the body 22 and has a downwardly directed pawl 24 and a pawl-manipulating lever 26 which, when pumped back and forth, causes the jack body 22 to move to the right in FIG. 1 the shelf 20, and the article engaged thereon. The strap 30 is drawn from the windlass and connected to the shelf 20 by hook 37 around the workpiece, and is then drawn under tension across the top of the set by turning the handle 35 on the windlass 34.

Figure 2:
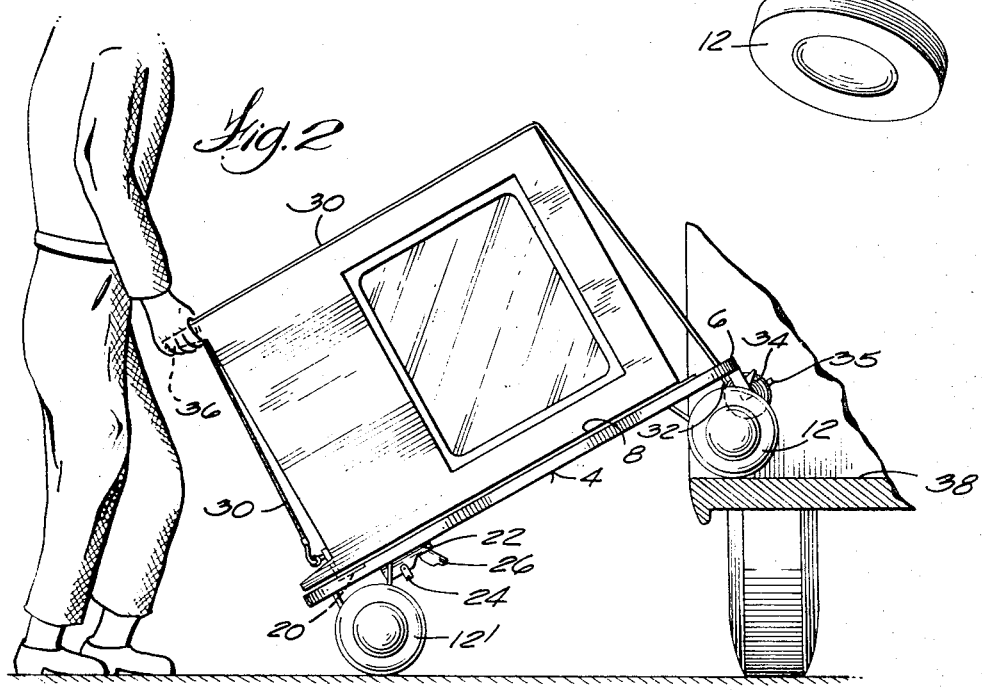
FIG. 2 is a view showing the set and dolly in side elevation with the vehicle shown fragmentarily in transverse section.

Regardless of the dimension of the workpiece the combination of the strap 30 and the jack 22 will secure the workpiece to the bed of the dolly. When the dolly is tilted as shown in FIG. 2, as by manipulating some of the legs 36 of the workpiece, used as handles, the weight of the assembly is readily balanced over the rear wheels 12' and lifted to the level of the vehicle deck 38 and rolled onto the vehicle. It is readily pushed into a position where it can be set upright on the vehicle deck for transportation if desired.

It will be observed that the jack and the windlass are working against each other and are dependent on each other for proper performance of their functions. Thus the jack would not properly anchor the strap and the workpiece if the strap were not tensioned across the workpiece between the windlass and the jack foot or shelf, on the margin of which the TV set is supported. Similarly, the windlass would not properly cause the jack foot to support the dolly but for the fact that the end of the windlass strap is anchored to the foot and develops tension on the workpiece in a direction such as to hold the set tightly to the foot and to the dolly frame.

When the frame is horizontal, the jack shelf 20 projects upwardly and may be generaly above dolly level on the face of the dolly which is normally uppermost. The windlass 34, however, is on the opposite face of the dolly frame below the level of that face. The jack post is at an intermediate level, below the aforesaid normally uppermost face of the dolly. This enables the operator to place the dolly on end directly next to the set or workpiece before starting to manipulate the jack or the windlass to tension the strap.

Upon arriving at the desired ultimate location, it is a very simple matter to turn the dolly upright and thereupon to release the windlass latch 39, unhook the hook 37 and withdraw the strap 30 from the transported article. Pawl 24 is released and the jack handle manipulated to lower shelf 20 until the legs of the set again rest on the floor.

It will be understood that the dolly and its connections to the entertainment set can be used independently of the stair attachment now to be described and illustrated in FIGS. 3–6.

When the attachment is to be used, the fittings 42 are hooked over the cross member 44 on the frame of the dolly and connected thereto by spring pressed pins 46, and by connecting to the dolly frame the uprights 48 on the subframe 50. At the rear of the subframe are hook-shaped fittings 52 engaged over the rear axle 10 of the dolly. Engagement is releasably maintained by the spring 56 for disconnection. It is only necessary to draw the hook-shaped fittings 52 forwardly against the bias of spring 56 and pull the pins 46 from their connection with frame element 44 of the dolly. This will permit complete disconnection of the attachment without in any way modifying the adjustment of the belts now to be described.

At the forward end of the attachment is a member 58 carrying the attachment front axle 60. A belt tightening screw 62 engaged with the transverse spanning member 58 and pushing forwardly on the front attachment axle 60 serves to tighten the attachment belts 64 which encircle at each side of the attachment pullies 66 and 68 over which the stair tread belts 64 are trained as shown in FIG. 4. At each side of the attachment connection, belts 64 trained over the pullies 66 and 68 carry the weight of the attachment, the dolly and the set to span a plurality of stairs as shown in FIG. 3, thereby distributing the weight to facilitate the operator in manipulating his load up or down stairs. When the attachment is not needed, it is readily dismounted in order to get rid of its weight.

I claim:

1. A dolly for transportation of an entertainment set, said dolly comprising a frame having a pair of wheels adjacent each of the ends, said wheels being positioned so that a pair of wheels and said frame stably support said frame and a load in upright position and said pairs of wheels support said frame in horizontal position, a jack having a post constituting a central longitudinal part of said frame and having a body portion slideably mounted on said post and provided with a ratchet handle depending downwardly when the dolly is upright, the said body portion constituting a shelf projecting upwardly when the dolly is upright and adapted for the support of an entertainment set, a windlass mounted on said dolly frame at a point longitudinally remote from said shelf, a strap trained over said windlass and having detachable connection with said body portion, said windlass being adapted to draw the strap under tension about the set and to hold the set against said dolly.

2. A workpiece and dolly in detachable assembly for unitary transportation and in which the workpiece may have legs providing handles for manipulation of the unitary assembly of workpiece and dolly, the dolly comprising a frame with a normally horizontal surface for supporting the workpiece, said frame having two pairs of wheels supporting said frame below said surface when said surface is horizontal, a said pair of wheels being positioned to coact with said frame to support said frame and said workpiece in substantially vertical position, said frame including a built-in jack with a post extending longitudinally of said frame and fixed therein and provided with a ratchet handle below the level of said surface, said jack further including a platform reciprocable along said jack post at said level, a windlass mounted on the dolly frame below said level, and a workpiece-engaging strap trained around the windlass, said strap extending above the said surface to be passed around the workpiece and having detachable anchorage with said platform and maintained under tension from the platform around the workpiece to the windlass for holding the workpiece and the dolly in releasable connection.

* * * * *